US011615221B1

(12) United States Patent
McMahon et al.

(10) Patent No.: US 11,615,221 B1
(45) Date of Patent: Mar. 28, 2023

(54) METHOD FOR MODELING THE SPREAD OF CONTAMINANTS IN MARINE ENVIRONMENTS

(71) Applicant: The United States of America, as represented by the Secretary of the Navy, Arlington, VA (US)

(72) Inventors: Matthew D. McMahon, Damascus, MD (US); Krzysztof J. Rutkowski, Riva, MD (US); Stephen M. Farley, Sterling, VA (US)

(73) Assignee: The United States of America, as represented by the Secretary of the Navy, Washington, DC (US)

( * ) Notice: Subject to any disclaimer, the term of this patent is extended or adjusted under 35 U.S.C. 154(b) by 1443 days.

(21) Appl. No.: 14/272,796

(22) Filed: May 8, 2014

(51) Int. Cl.
*G06F 30/20* (2020.01)
(52) U.S. Cl.
CPC .................................. *G06F 30/20* (2020.01)
(58) Field of Classification Search
None
See application file for complete search history.

(56) References Cited

U.S. PATENT DOCUMENTS

| | | | |
|---|---|---|---|
| 5,427,530 A | 6/1995 | Taggart | |
| 6,782,321 B1 | 8/2004 | Burton | |
| 6,839,632 B2 | 1/2005 | Grace | |
| 7,536,232 B2 | 5/2009 | Boyden | |
| 8,644,961 B2 | 2/2014 | Wroblewski | |
| 2004/0257264 A1* | 12/2004 | Moeller-Jensen | G01N 33/1833 342/52 |
| 2005/0010384 A1* | 1/2005 | Rheem | G06F 17/5018 703/10 |
| 2008/0020360 A1 | 1/2008 | Bahler | |
| 2011/0060551 A1* | 3/2011 | Elhajj | G01B 7/06 702/166 |
| 2012/0197604 A1* | 8/2012 | Badiey | G06F 17/5009 703/2 |

(Continued)

OTHER PUBLICATIONS

Chao et al., Two and three-dimensional oil spill model for coastal waters, 2001, Pergamon, pp. 1557-1573.*

(Continued)

*Primary Examiner* — Boris Gorney
*Assistant Examiner* — Bernard E Cothran
(74) *Attorney, Agent, or Firm* — Howard Kaiser

(57) ABSTRACT

Exemplary practice of the present invention defines "sphibules" in computer-modeling the spread of a substance in a fluid medium. A "sphibule," a modeling entity conceived and named by the present inventors, represents a discrete quantity of a substance that is propagative in a fluid medium. Every sphibule has the same size when created, the same constant geometric shape, the same constant mass, and a uniform density. Multiple sphibules are created at a prescribed rate at a source in the fluid medium. Several or many timesteps are performed to compute enlargement and relocation, in the fluid medium, of each sphibule that has been created. Through succeeding timesteps, each sphibule becomes less dense and more distant from the source. A sphibule ceases to exist when the sphibule is less dense than a prescribed minimum density of the sphibules, and/or when the sphibule travels beyond a prescribed spatial boundary of the fluid medium.

20 Claims, 5 Drawing Sheets

(56) References Cited

U.S. PATENT DOCUMENTS

| | | | |
|---|---|---|---|
| 2013/0314432 | A1 | 11/2013 | Cui et al. |
| 2017/0091350 | A1 | 3/2017 | Bauer et al. |
| 2017/0140282 | A1 | 5/2017 | Bai et al. |
| 2017/0272338 | A1 | 9/2017 | Borrel |
| 2017/0300818 | A1 | 10/2017 | Sinitsyn et al. |
| 2017/0316328 | A1 | 11/2017 | Dong et al. |
| 2018/0082199 | A1 | 3/2018 | Liu et al. |
| 2018/0188050 | A1 | 7/2018 | Duan et al. |
| 2018/0202824 | A1 | 7/2018 | Borrel |
| 2018/0286288 | A1 | 10/2018 | Di Donato |

OTHER PUBLICATIONS

The Free Dictionary, Ellipse—definition of ellipse, 2019, The Free Dictionary, pp. 1-3 (Year: 2019).*

Editors of Encyclopaedia Britannica, Density, 2019, Britannica.com, pp. 1-4 (Year: 2019).*

Papadimitrakis et al., Simulating the fate of an oil spill near coastal zones: The case of a spill (from a power plant) at the Greek Island of Lesvos, 2006, Elsevier, pp. 170-177 (Year: 2006).*

De Dominicis et al., MEDSLIK-II, a Lagrangian marine surface oil spill model for short-term forecasting—Part 1: Theory, 2013, Geoscientific Model Development, pp. 1851-1869 (Year: 2013).*

Merriam-Webster, Definition of ellipsoid, 2020, Merriam-Webster, pp. 1-2 (Year: 2020).*

Dictionary.com, multiplicity, 2020, Dictionary.com, pp. 1-5 (Year: 2020).*

William B. Samuels, David E. Amstutz, Rakesh Bahadur, and Christopher Ziemniak, "Development of a Global Oil Spill Modeling System", Earth Science Research; vol. 2, No. 2, Canadian Center of Science and Education, online published Mar. 6, 2013 (10 pages).

Motahareh Saadatpour and Abbas Afshar, "Multiobjective Simulation-Optimization Approach in Pollution Spill Response Management Model in Reservoirs", VI EWRA International Symposium, Water Engineering and Management in a Changing Environment, Catania, Jun. 29-Jul. 2, 2011 (12 pages).

M. De Dominicis, N. Pinardi, and G. Zodiatis, "MEDSILK-II, A Lagrangian Marine Oil Spill Model for Short-term Forecasting—Part 1: Theory," Geosci. Model Devel. Discuss., 6, pp. 1949-1997, 2013, www.geosci-model-dev-discuss. net/6/1949/2013/, published Mar. 8, 2013.

M. De Dominicis, N. Pinardi, and G. Zodiatis, "MEDSILK-II, A Lagrangian Marine Oil Spill Model for Short-term Forecasting—Part 2: Numerical Simulations and Validations," Geosci. Model Devel. Discuss., 6, pp. 1999-2043, 2013, www.geosci-model-dev-discuss. net/6/1999/2013/, published Mar. 8, 2013.

Itay Rosenzweig and Ben R. Hodges, "A Python Wrapper for Coupling Hydrodynamic and Oil Spill Models," Center for Research in Water Resources, the University of Texas at Austin, CRWR Online Report Nov. 2009, submitted to Texas General Land Office Oil Spill Prevention & Response, FY 2011 Report under Contract No. 10-097-000-3928, Oct. 31, 2011 (48 pages).

James F. Price, "Lagrangian and Eulerian Representations of Fluid Flow: Kinematics and the Equations of Motion," Woods Hole Oceanographic Institution, Woods Hole, MA, http://www.whoi.edu/science/PO/people/jprice, Jun. 7, 2006 (91 pages).

Martinho Marta-Almeida, Manuel Ruiz-Villarreal, Janini Pereira, Pablo Otero, Mauro Cirano, Xiaoqian Zhang, and Robert D. Hetland, "Efficient Tools for Marine Operational Forecast and Oil Spill Tracking," Marine Pollution Bulletin, vol. 71, Issues 1-2, pp. 139-151, Jun. 15, 2013.

Xianlong Hou, "Evaluating Hydrodynamic Uncertainty in Oil Spill Modeling," Thesis, approved by supervising committee, presented to the faculty of the Graduate School of the University of Texas at Austin in partial fulfillment of the requirements for the degree of master of science in engineering, the University of Texas at Austin, May 2013 (68 pages).

Xianlong Hou and Ben R. Hodges, "Hydrodynamic Uncertainty in Oil Spill Modeling," Center for Research in Water Resources, The University of Texas at Austin, submitted to the Texas General Land Office, Oil Spill Prevention & Response, FY 2013 Report under Contract No. 10-097-000-3928, Sep. 30, 2013 (48 pages).

Celia Laurent, Stefano Querin, Cosimo Solidoro, and Donata Melaku Canu, "Modelling Marine Particle Dynamics with LTRANS-Zlev: Implementation and Validation," Environmental Modelling and Software 125 (2020) 104621, Elsevier Ltd., available online Jan. 10, 2020 (12 pages).

* cited by examiner

METHOD FOR MODELING THE SPREAD OF CONTAMINANTS IN MARINE ENVIRONMENTS

BACKGROUND OF THE INVENTION

The present invention relates to computer modeling and simulation, more particularly to computer modeling and simulation representative of the spread of contaminants (e.g., pollutants, chemicals, impurities) in bodies of water.

Some conventional models of contaminant spreading (e.g., National Oceanic and Atmospheric Administration's "GNOME" program) use fluid dynamics, are Eulerian and Lagrangian in nature, and are designed to estimate the total lateral spread of contaminants. According to these existing models (for instance, in the case of an oil spill), the entire oil spill volume is discretized at a given initial point and time. Each of the discrete pieces of the spill is treated as a Lagrangian point element. The Lagranian point element's motion due to the host fluid is represented as an Eulerian flow field and is computed explicitly at each time step. Random components of motion due to diffusive behavior are drawn from the appropriate distribution and are summed with the non-random components of the host fluid influence to obtain the new position of the point element. As the simulation evolves, a boundary line drawn between the positions of the outermost point elements allows the user to estimate the extent of contaminant spreading.

However, because each of the elements is represented as a point, these existing models are insufficient for estimating the amount of contaminant at any given spatial point, especially at positions far from the initial site. Hence, these existing models are ineffective for purposes of estimating values (e.g., sensor performance as a function of position) that relate to locational variations of contaminant amounts or concentrations, such as commonly required for Navy environmental models. There is a need for a more effective method for representing a contaminant field in a time-stepped operations model.

SUMMARY OF THE INVENTION

In view of the foregoing, an object of the present invention is to provide a better computer modeling methodology for representing the spread of contaminants in a body of water such as an ocean, sea, lake, river, etc.

Much of the difficulty in effectively modeling the spread of contaminants in a marine environment lies in the dynamic complexities relating to the contaminants. Contaminants in water dissipate over time, and their movement is also influenced by prevailing currents, sea state, buoyancy, and gravity of the constituent particles. In meeting these challenges, the present invention uniquely features implementation of an element that the present inventors have dubbed a "sphibule." A sphibule is a representation, by an inventive model, of a discrete quantity of a substance that propagates (e.g., diffuses or dissipates) in a fluid (e.g., liquid or gaseous) medium. "Sphibule" is the term coined by the present inventors to denote these propagative bodies. An exemplary inventive model implements sphibular bodies that all have the same geometric shape.

Exemplary inventive practice uses sphibules to model contaminant release and dissipation. Each sphibule is a separate entity consisting of or constituted by one or more kinds of contaminants. The contaminant sphibules are individual cells of uniform density and constant mass that evolve over time. Exemplary inventive embodiments use sphibules having an ellipsoidal (e.g., spherical) geometric shape. Nevertheless, the present invention admits of practice implementing sphibules of a variety of other shapes, regular or irregular, for instance more complex shapes having more complicated inventive calculations associated therewith. Examples of other spheroidal shapes that may be suitable for inventive practice include cylindrical, conical, pyramidal, prismatic (e.g., cuboidal), toroidal, etc.

Plural (e.g., multiple) sphibules are used to model the course of contaminants in water and to simulate the effects of complex hydrodynamic properties. The present invention performs these tasks efficaciously and without explicitly using computationally expensive fluid dynamic representations. Accordingly, inventive practice is capable of including hydrodynamic effects in its timed-stepped operations models without incurring overwhelming run times. Key phenomena represented in an exemplary inventive model/simulation include: (i) mass transfer flows due to marine currents, gravitational forces, and buoyant forces; and, (ii) decreasing concentration with time due to diffusion.

An exemplary inventive embodiment treats the random component of the motion of the contaminant differently from the non-random component of the motion of the contaminant. The centroid of a sphibule moves only according to the non-random influence of the host field (e.g., Eulerian host fluid). On the other hand, the random component of the motion of the contaminant is treated implicitly rather than explicitly. That is, the random component of the motion of the contaminant is implicitly accounted for through an increase in the size of the sphibule. As time passes, the sphibules flow under the influence of current and gravity, and expand to indicate lower contaminant density and a more diffuse field.

Usual inventive practice implements a computer and a computer display to facilitate inventive modeling. The computer includes a processor and memory/storage, both volatile and non-volatile. An inventive algorithm may be coded in practically any computer programming language. The present invention can be embodied, for instance, as a computer-implemented method, a system or apparatus including a computer, or a computer program product. Some inventive embodiments graphically display dynamics of creation, evolution, and death of sphibules in a fluidic space. Although the terms "model" and "simulation" have occasionally been distinguished from each other in technical usage, these terms are used interchangeably herein to broadly refer to representation of a thing or system of things, for instance to representation of characteristics and behaviors of oil spills and other manifestations of contaminant spreading.

The present invention can be practiced to model diverse situations in which a substance spreads in a fluid medium, which can be liquid (e.g., water) or gaseous (e.g., air). The present invention is frequently practiced to model any of a variety of scenarios involving proliferation of contaminants in water bodies. The term "substance" is used herein to broadly refer to matter or material or composition. A substance has mass and takes up space. Depending on the substance, it can have one, or more than one, element or constituent or component.

Exemplary practice of the present invention models the spread of a substance in a fluid medium. In accordance with exemplary practice of the present invention, a generation rate is defined; this is a rate of generation of a plurality (e.g., multiplicity) of sphibules from a source in a fluid medium. Each sphibule represents a discrete quantity of a substance that is propagative in the fluid medium. Plural timesteps are effected for describing change in size and change in position of each sphibule subsequent to its generation as it moves in the fluid medium. In each timestep, with respect to each sphibule, a computer calculates the size of the sphibule, and calculates the position of the sphibule.

The sphibule size calculation and the sphibule position calculation are based, respectively, on the previous size and the previous position of the sphibule. If the timestep is the first timestep, then the previous size and previous position of the sphibule are the size and position of the sphibule as it existed upon generation of the sphibule from the source. If the timestep is the second or greater (e.g., third, fourth, fifth, etc.) timestep, then then the previous size and previous position of the sphibule are the size and position of the sphibule as it existed in the previous timestep.

Every sphibule has the identical mass, identical geometric shape, and identical initial size (i.e., size when generated from the source). Over time, the mass and shape of every sphibule remain the same, and the density of every sphibule changes but remains uniform. A spatial region of the fluid medium is delimited. A size threshold is established for every sphibule; according to frequent inventive practice, this size threshold is the same for every sphibule. In each timestep, each sphibule is evaluated with respect to whether the sphibule proceeds to the next timestep. The sphibule is eliminated (i.e., does not proceed to the next timestep) when the position of the sphibule exceeds the spatial region, and/or when the size of the sphibule exceeds the size threshold.

BRIEF DESCRIPTION OF THE DRAWINGS

The present invention will now be described, by way of example, with reference to the accompanying drawings, wherein.

DESCRIPTION OF EXEMPLARY
EMBODIMENTS OF THE INVENTION

Figure 1:
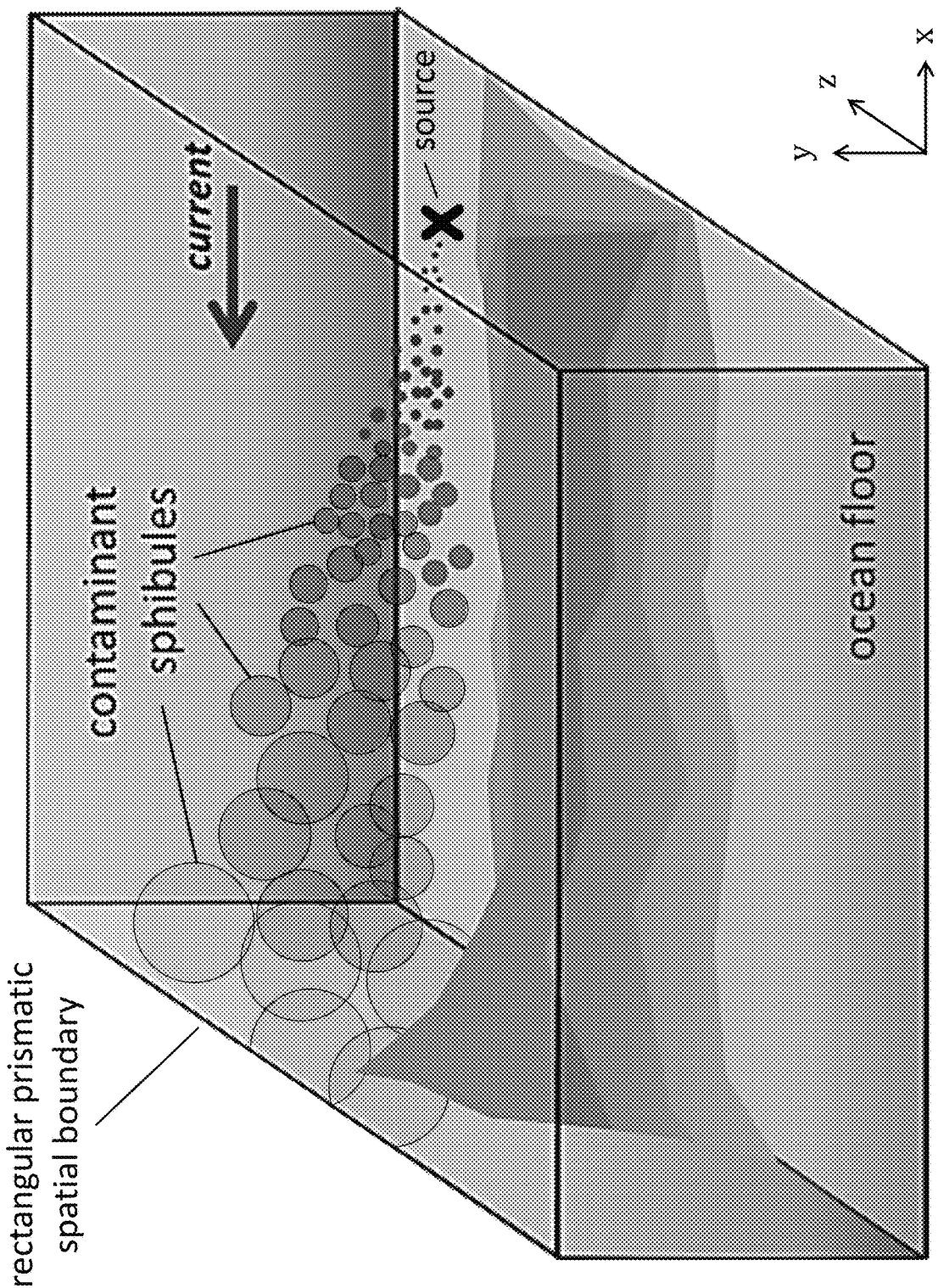
FIG. 1 is a diagrammatic perspective view illustrating an example, in accordance with the present invention, of implementation of sphibules to represent the spread of contaminants in a body of water such as an ocean.

With reference to the figures, exemplary practice of the present invention models (simulates), over time, the movements and expansions of multiple ellipsoidal elements, which the present inventors have named "sphibules." An exemplary inventive model (simulation) represents translation and diffusion/dissipation of a contaminant substance that is introduced to and spreads in a body of water. FIG. 1 depicts exemplary inventive modeling of the generation, movement, and enlargement of contaminant sphibules.

As shown in FIG. 1, the sphibules are generated at a source location and then move generally in the right-to-left direction of the marine current. In time-stepped fashion, the sphibules reposition and grow. Each sphibule has a constant geometric shape, a constant total mass, and a uniform density throughout. With each succeeding timestep, every sphibule changes position and increases in size. FIG. 1 illustrates that, with increasing time and distance from the source, the sphibules increase in size and hence (because of their constant mass) decrease in density. The sphibules are shown to become larger and less dense (greater density is represented by darker shading of the sphibule; lesser density is represented by lighter shading of the sphibule) as the sphibules change in timesteps, both positionally and dimensionally. Over time, a sphibule increases in size and distance from the source, but does not change in shape.

In the context of an inventive model, each sphibule originates at the source, evolves over time, and has a finite lifespan. The demise of a sphibule occurs upon either of two circumstances, viz.: (i) when the sphibule reaches or exceeds a specified model space threshold; (ii) when the sphibule reaches or exceeds a specified density threshold. It is not necessarily the case that every sphibule is eventually eliminated; so long as a sphibule remains within its size and positional limits, it shall remain in the inventive model. The model space is shown in FIG. 1 to have a rectangular box-shaped boundary (synonymously describable as having a boundary that is a rectangular cuboid, a rectangular prism, or a rectangular parallelepiped). However, inventive practice is possible providing for model space of practically any configurative description. Since a sphibule's mass remains the same, a density threshold is tantamount to a size threshold. In other words, designating a density threshold is equivalent to designating a size (e.g., radial or volumetric) threshold.

Figure 2:
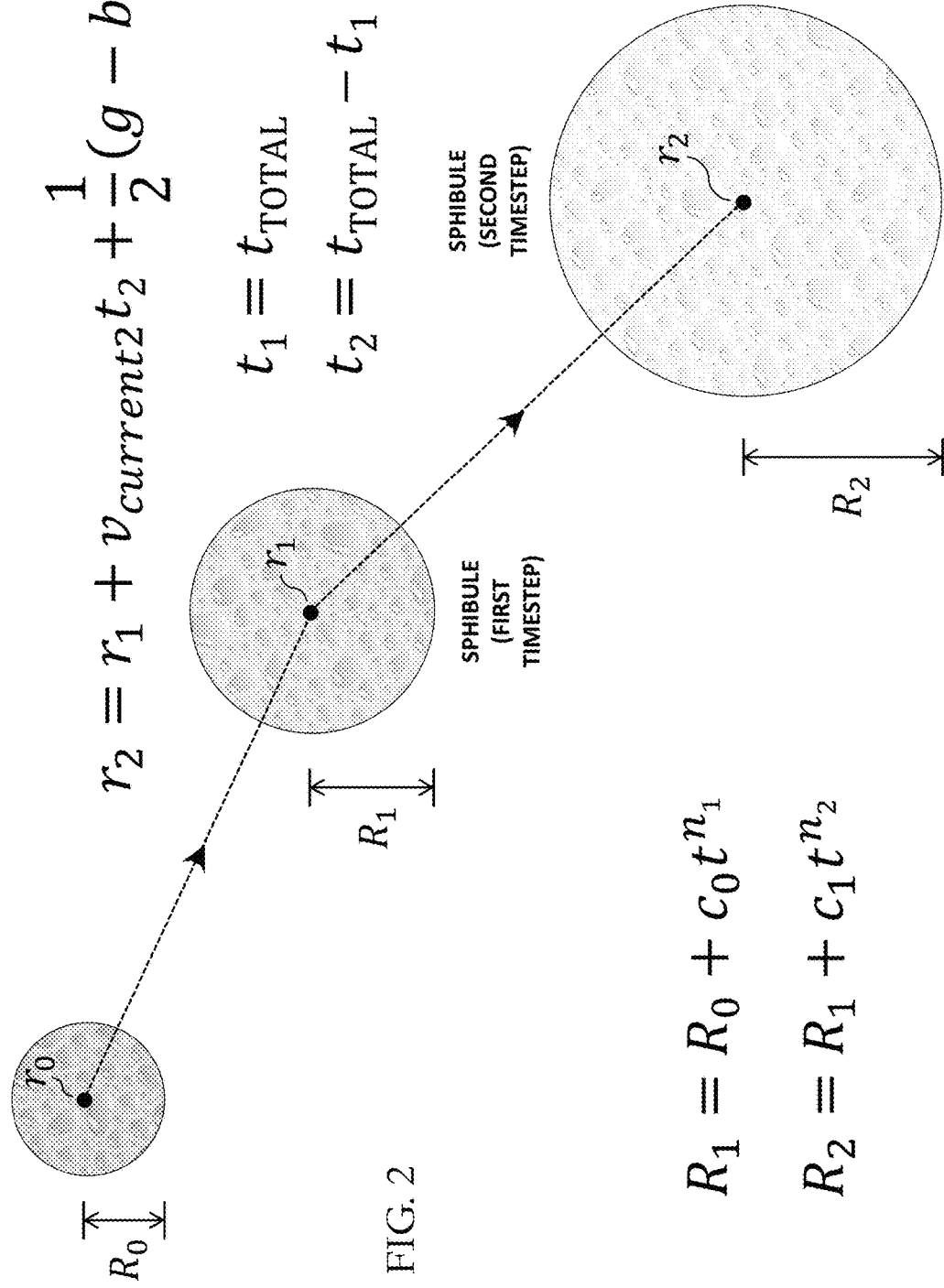
FIG. 2 and FIG. 3 are similar schematics each illustrating an example, in accordance with the present invention, of change over time of an individual sphibule in terms of its size and position. As depicted in each figure, a sphibule is created and then proceeds through two timesteps of its evolution. The sphibule shown in FIG. 2 is spherical. The sphibule shown in FIG. 3 is non-spherical ellipsoidal.
Figure 3:
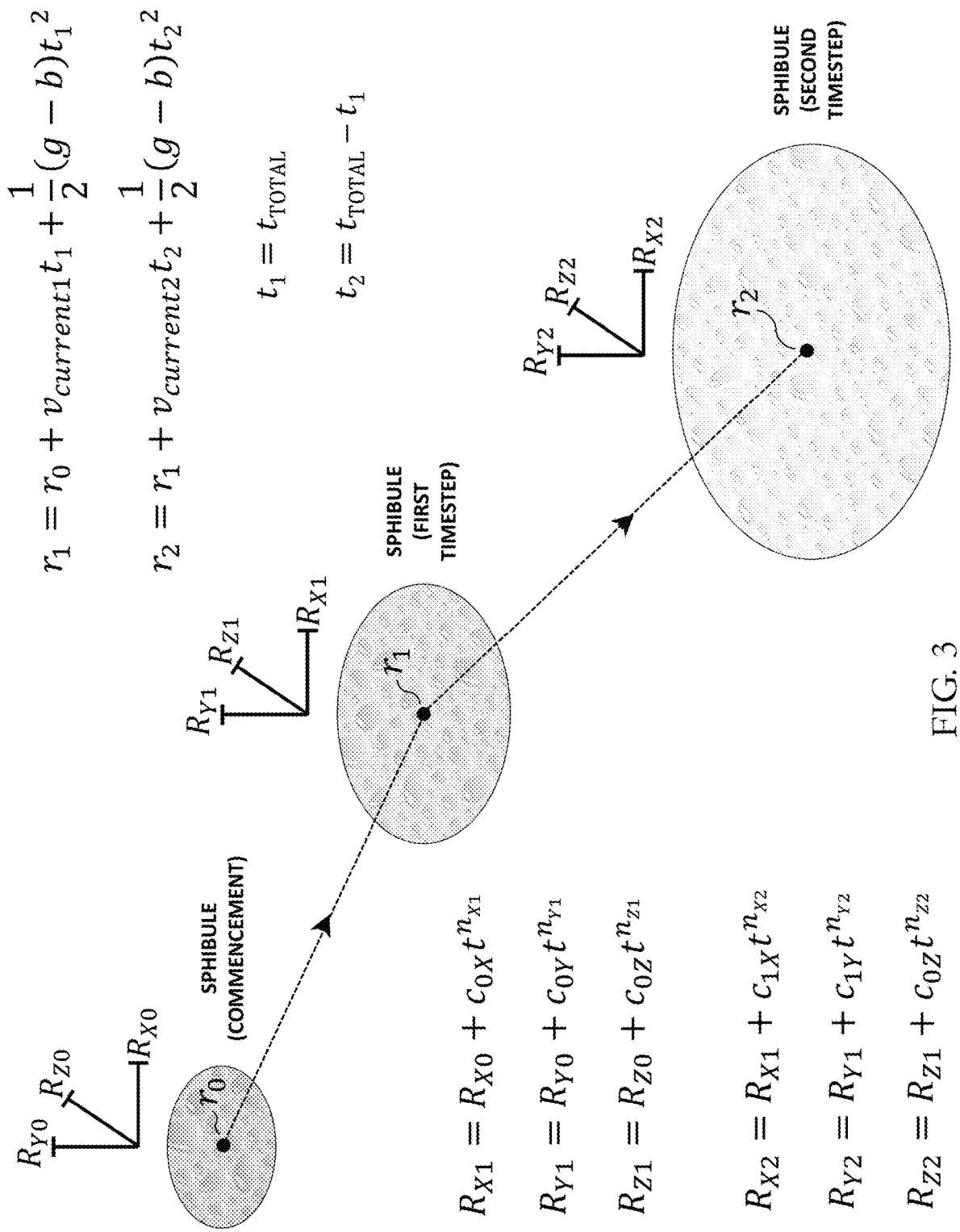
Figure 4:
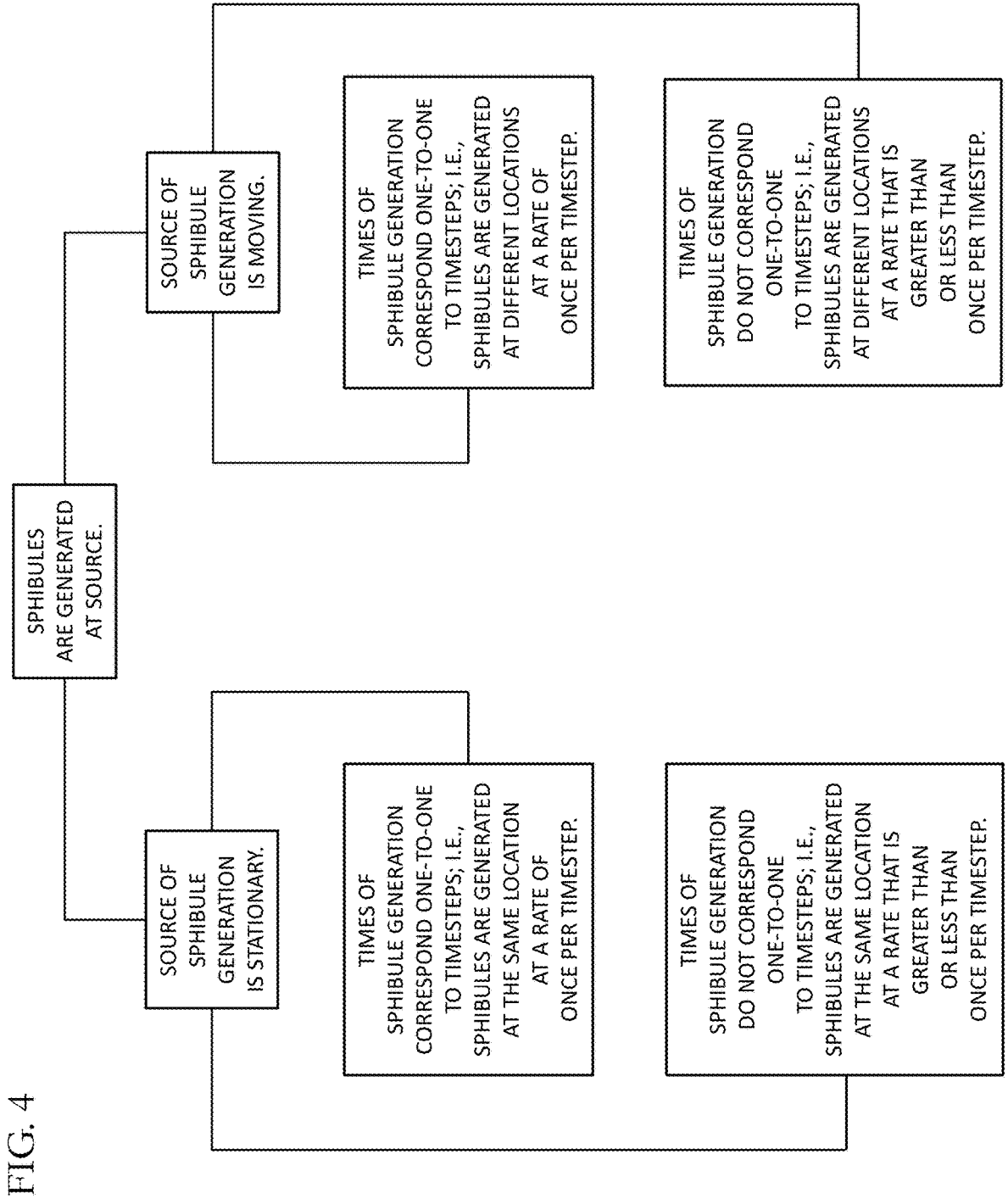
FIG. 4 is a block diagram illustrating exemplary practice, in accordance with the present invention, of establishing the rate or rates at which the sphibules are created at their source of creation.
Figure 5:
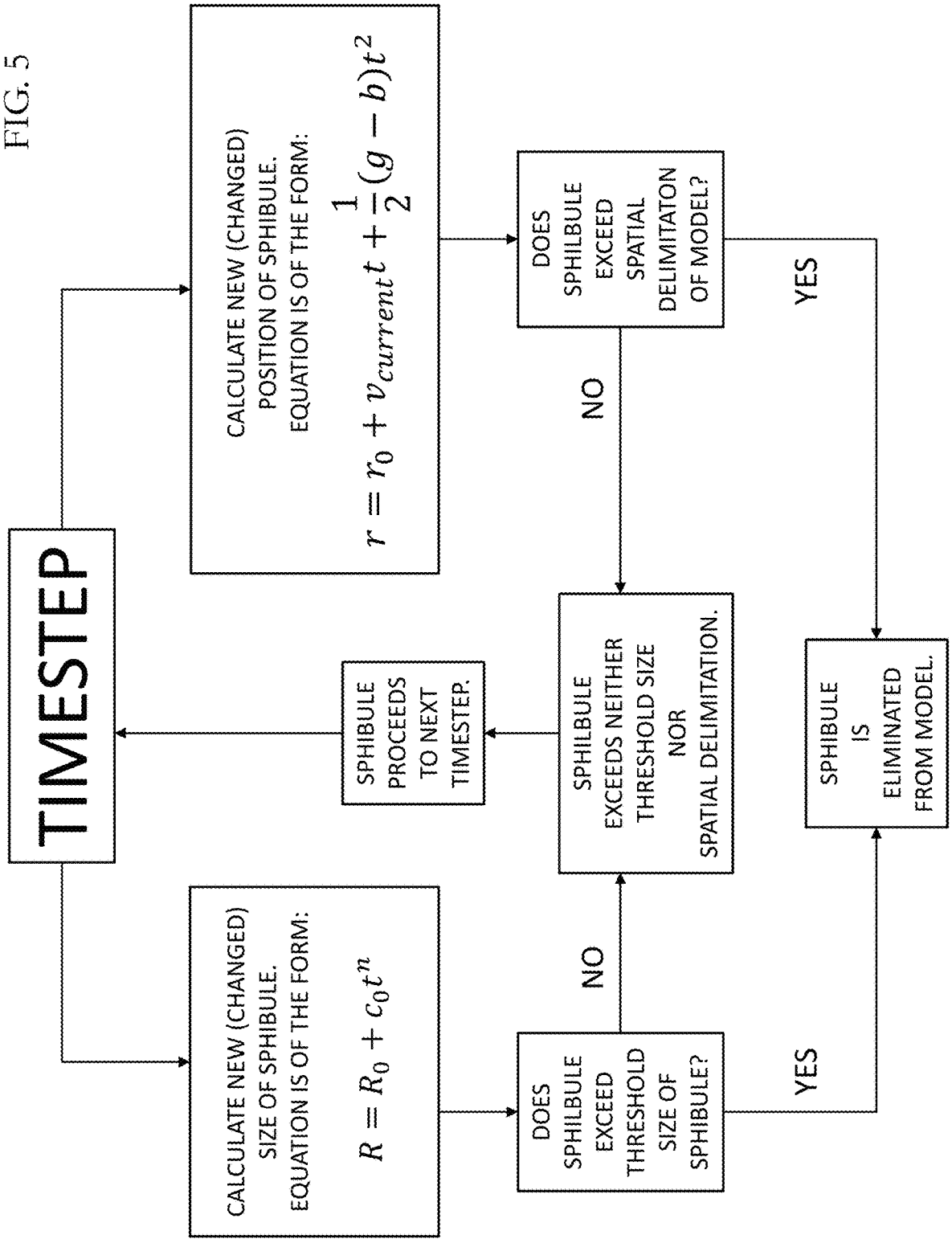
FIG. 5 is a block diagram illustrating exemplary practice, in accordance with the present invention, of the time-stepped evolution of an individual sphibule until its destruction.

With reference to FIGS. 2 and 3, an exemplary inventive model characterizes a sphibule as ellipsoidal, constant in mass, and uniform in density. The ellipsoidal sphibule is either spherical (such as shown in FIG. 2) or non-spherical (such as shown in FIG. 3). The positional change of the sphibule is described with reference to translation of its centroid. The density of the ellipsoidal sphibule (density equals mass per unit volume) is uniform, and hence the sphibule's centroid is the sphibule's center.

According to exemplary inventive practice, a time-stepped progression of sphibules is computed in terms of positional (locational) change and dimensional (size) change. In each timestep: (i) The sphibule's new position, which differs from its previous position, is calculated; (ii) the sphibule's new size, which differs from (usually, is greater than) its previous size, is calculated. Mathematical expressions used in exemplary inventive embodiments for performing such computations are set forth hereinbelow.

The sphibules are developed for every timestep in the inventive model. Two equations together govern the movement, size, and density of each of the sphibules. The first equation governs movement. The second equation governs size and density. Calculation of the positional change of a sphibule is based on physical phenomena including velocity of the water current, gravitational acceleration, and buoyant acceleration. Calculation of the dimensional (e.g., radial or volumetric) change of a sphibule incorporates scalar values obtained from empirical data and/or modeling data.

As shown in FIG. 2, a spherical sphibule generated at a source has a center $r_0$ and a radius $R_0$. The position of the original sphibule is considered to be the position of its center $r_0$. In the first timestep, the sphibule has center $r_1$. The radius of the sphibule has increased to $R_1$, where $R_1 > R_0$. The position of the first-timestep sphibule is considered to be the position of its center $r_1$. Time $t_1$ and position $r_1$ are determined relative to time $t_0$ and position $r_0$. The position of center $r_1$ is a function of time $t_1$, center $r_0$, marine current $v_{current}$, gravitational acceleration g, and buoyant acceleration b. Similarly, in the second timestep, the sphibule has center $r_2$. The radius of the sphibule has increased to $R_2$, where $R_2 > R_1$. The position of the second-timestep sphibule is considered to be the position of its center $r_2$. Time $t_2$ and position $r_2$ are determined relative to time $t_1$ and position $r_1$. The position of center $r_2$ is a function of time $t_2$, center $r_1$, marine current $v_{current}$, gravitational acceleration g, and buoyant acceleration b.

The inventive principles are the same for the non-spherical ellipsoidal sphibules shown in FIG. 3, as they are for the spherical sphibules shown in FIG. 2. The positions of sphibules are similarly calculated in timesteps based on distances between centers of sphibules. A notable mathematical distinction is that a spherical ellipsoid has a single radius, whereas a non-spherical ellipsoid has three principle semiaxes ($R_x$, $R_y$, $R_z$), corresponding to x, y, and z geometric planes in three-dimensional Cartesian space. Thus, as illustrated in FIG. 3, calculations are performed as to each of the three semiaxes of the non-spheriodal ellipsoid. Calculations simplify when two of the semiaxes are equal. Calculations simplify further when all three of the semiaxes are equal, as the ellipsoid is not non-spherical, but rather is spherical.

For performing calculations pertaining to position and translation of a sphibule, exemplary inventive practice uses an equation of the following form:

$$r = r_0 + v_{current} t + \frac{1}{2}(g-b)t^2 \quad (1)$$

where $r_0$=previous position of sphibule; r=next position of sphibule; $v_{current}$=velocity of current; t=time; g=acceleration due to gravity; b=acceleration due to buoyancy.

Equation (1) represents the position r of the centroid of a sphibule with time t. The position of the centroid of the sphibule, r, is given by the previous position (e.g, previous timestep position or initial launch position) of the sphibule, $r_0$, plus the initial new velocity components of the prevailing current and the source multiplied by time, t. The acceleration term, $\frac{1}{2}(g-b)t^2$, represents the vertical contribution of gravity and buoyancy on the sphibule centroid.

For performing calculations pertaining to size and density of a sphibule, the following equation relates the rate of radius increase with time:

$$R = R_0 + c_0 t^n \quad (2)$$

where $R_0$=previous radius of the sphibule; R=next radius of sphibule; t=time; $c_0$=scalar coefficient; n=scalar exponent.

Equation (2) represents the radius R of a spherical contaminant sphibule with time t. Radius $R_0$ is the previous radius (e.g., previous timestep radius or initial launch radius) of the sphibule. Scalar coefficient $c_0$ is some positive number to be determined from data. Similarly, scalar exponent n is some positive number to be determined from data. Note that the radius of a sphibule is always greater than zero. Even an initial launch (generation) radius of a sphibule must be greater than zero, as a radius of zero would unrealistically imply an infinite contaminant concentration.

Equation (2) applies to a spherical sphibule. The generalization of Equation (2) to an ellipsoidal sphibule is set forth hereinbelow as Equations (2.1), (2.2), and (2.3). Note that, geometrically, a sphere is a type of ellipsoid; if all three principal semiaxes (x-semiaxis, y-semiaxis, z-semiaxis) of an ellipsoid are equal, then the ellipsoid is a sphere. According to conventional geometric definition, an ellipsoid can have three equal semiaxes (thus constituting a sphere), or two equal semiaxes and one unequal semiaxis, or three unequal semiaxes.

In the generalized case of an ellipsoidal sphibule, the equations for the semiaxes of the ellipsoid have the same form as that of the radius of the spherical sphibule. Assuming that the axes of the ellipsoid are aligned with Cartesian coordinates, the equations would take the form $$R_x=R_{x0}+c_{0x}t^{n_x} \tag{2.1}$$

$$R_y=R_{y0}+c_{0y}t^{n_y} \tag{2.2}$$

$$R_z=R_{z0}+c_{0z}t^{n_z} \tag{2.3}$$

where $R_x$, $R_y$, $R_z$ are the semiaxes along the x, y, z directions respectively, and the coefficients are as described for a spherical sphibule.

According to Equations (2.1), (2.2), and (2.3), the axes of the ellipsoidal sphibule are aligned with Cartesian coordinates. The ordinarily skilled artisan who reads the instant disclosure will be able to generalize the form described by Equations (2.1), (2.2), and (2.3) to situations wherein the axes of the ellipsoidal sphibule are not aligned with Cartesian coordinates.

It is understood by a skilled artisan who reads this disclosure that Equations (2), (2.1), (2.2), and (2.3) may be applicable to sphibules existing in liquid (e.g., aqueous or hydrous) environments, as well as to sphibules existing in gaseous (e.g., atmospheric or air) environments. In Equations (2), (2.1), (2.2), and (2.3), the scalar coefficients and scalar exponent(s) may be determined in any of various ways. A first preferred method for determining the scalar values involves comparison to measured experimental data, such as data obtained from physical sensors measuring contaminant density as a function of time in natural environments (e.g., oil spills in seawater), or in controlled laboratory experiments with well-characterized sources. A second preferred method for determining the scalar values involves comparison with high-fidelity physics/engineering models (such as computational fluid dynamics models) of contaminant dispersion. If the interactions are diffusive in nature, the data may be fit to an exponential model representing contaminant dispersion with time in accordance with inventive principles.

The three main stages or phases of a sphibule are its birth (creation or generation), lifetime (evolution or change), and death (destruction or elimination). FIG. 4 describes variations of inventive practice with respect to the generation of sphibules. FIG. 5 describes the progression of a sphibule through timesteps subsequent to its generation, and until it meets the criterion/criteria for its elimination from the scope of the inventive model. According to frequent inventive practice, each timestep includes creation, evolution, and elimination of sphibules.

Sphibules are created in an exemplary inventive model at the location of a source. The source is defined as being capable of dispensing sphibules of a given type at a given rate. The rate of sphibule generation may vary as a function of time, or spatial position, or both time and spatial position. The source position may be stationary in the inventive model, or may change with time in the inventive model. Examples of sources of oil spills include tankers, pipelines, and offshore platforms. Another example of a source of oil contamination is a natural seepage that can occur from beneath a sea floor. Other kinds of marine pollution include chemicals, particles, waste, and invasive organisms. Some pollutants can adversely affect water quality as well as air quality.

For a moving source, the positional distribution of sphibules created in each time step may be scaled between the current timestep position and the previous timestep position. This scaling can be performed according to any of diverse mathematical scaling laws and techniques that the inventive practitioner may favor. For some inventive embodiments, it may be preferable to use a linear scaling law to scale a positional distribution of sphibules. By way of example, let us assume that an inventive model provides for a timestep of five seconds, and a rate of sphibule generation of one sphibule per second. If the position of a sphibule changes at the $i^{th}$ timestep from $x_{i-1}=0$ feet to $x_i=5$ feet, a possible approach would be to place five sphibules at x locations of 1, 2, 3, 4 and 5 feet.

A more complex approach involves scaling of the sphibule creation-time references by fractions of a time-step. In the radius equations, $t_{TOTAL}$ is the time since the creation of the sphibule. Depending on the embodiment of an inventive time-stepped model, the sphibule creation times may or may not correspond exactly to the timesteps of the inventive model. This is so for inventive models characterized by a stationary source as well as inventive models characterized by a moving source. Note that, going forward after creation of the sphibules, the positions and sizes of the sphibules will be computed only at the actual timesteps of the inventive model. According to exemplary embodiments of the present invention, the computations always correspond to the timesteps, regardless of whether not the times at which the sphibules are created correspond to the timesteps.

An important concept of exemplary inventive practice is the continued expansion of sphibule size until the density of the contaminant in the sphibule is far less than the minimum density that is detectable by the most capable sensor in the model environment. In this case, even concentrations of sphibules will not be detectable by sensors in the inventive model. Upon such circumstance of undetectability, the inventive model eliminates those sphibules. Attribution of a threshold density to a sphibule is tantamount to attribution of a threshold size (e.g., radius or volume) to a sphibule. Every time-step, new sphibules may be created, and all of the previously existing sphibules move and expand. The number and distribution of sphibules generated each time-step are determined by experimentation in the inventive model.

In an exemplary inventive model/simulation, a sphibule is destroyed (e.g., ceases to be tracked or accounted for) upon the occurrence of either or both of the following conditions: (i) when the sphibule exits the spatial boundaries of the inventive model/simulation; (ii) when the radius of the sphibule increases to the point at which the effective "density" of the contaminant becomes undetectable by the most sensitive sensor in the inventive model/simulation. With regard to the notion of a "threshold" as relates herein to sphibule size or model space, no significant distinction is intended herein between "reaching" a threshold and "exceeding" a threshold.

Depending on the inventive embodiment, the spatial threshold can be defined in terms of complete passage beyond the spatial boundary, partial passage beyond the spatial boundary, or touching of (contiguity to) the spatial boundary. Conceptually, the density of a sphibule is in an inverse relationship with respect to the volume of the sphibule. According to some inventive embodiments, for ease of computation, the detectability is represented in the simulation by a maximum sphibule radius; sphibules are discarded in the inventive model when their respective radii exceed this detectability radius.

In contrast to the prior art, the present invention's modeling methodology models the spread of contaminants in such a way that their detection may also be calculated conveniently by probabilistic means. A point detector may be simulated in an inventive model because detection can be calculated on the basis of the number and/or size of sphibules that overlap the detection point. Physics-based hydrodynamics models are far too complex and computationally expensive for mission-level modeling. Using its sphibules, the inventive methodology can captures dectectability in terms of the time-varying concentration of a feature relative to background levels.

The United States Navy uses a mission model, as the need arises, to represent the spread of contaminants in an ocean or other body of water. For instance, a potential mission area for the Navy is crisis response to a catastrophic industrial spill or to an underwater leak of crude oil at extreme depths. The inventive methodology opens new vistas for naval operations modeling. Unlike existing models, the inventive model can combine three-dimensional hydrodynamic effects in the water column with other important features of Navy modeling, such as radar propagation, underwater acoustic propagation, command and control, communications systems, and decision-making.

The present invention can practiced to model or simulate hydrodynamic phenomena other than the spread of contaminants (e.g., water pollution), or to model or simulate aerodynamic phenomena. For instance, inventive modeling of contaminant sphibules (e.g., air pollution) in the air or atmosphere can involve scientific principles bearing some analogy to the dynamics of lighter-than-air objects such as blimps, helium balloons, and hot-air balloons, which are subjected to both gravitational forces and buoyant forces during flight. Furthermore, some inventive embodiments can use sphibules to predict phenomena such as surface scarring, temperature distributions and mixing effects, and pressure gradients.

The present invention, which is disclosed herein, is not to be limited by the embodiments described or illustrated herein, which are given by way of example and not of limitation. Other embodiments of the present invention will be apparent to those skilled in the art from a consideration of the instant disclosure, or from practice of the present invention. Various omissions, modifications, and changes to the principles disclosed herein may be made by one skilled in the art without departing from the true scope and spirit of the present invention, which is indicated by the following claims.

What is claimed is:

1. A computer-implemented method for modeling the spread of a substance over time in a fluid medium, the method comprising:

defining a multiplicity of sphibules in a spatial region of a fluid medium, said spatial region characterized by a rectangular prismatic boundary and three dimensions, wherein:

said sphibules are continuously being released from a stationary or moving source in said fluid medium;

said sphibules are characterized by a rate of said release from said stationary or moving source in said fluid medium;

said sphibules collectively represent a substance that is propagative in said fluid medium, said substance consisting of said sphibules;

each said sphibule is a separate and discrete sphere individually representing a separate and discrete quantity of said substance;

each said sphibule is characterized by: a uniform density; the same constant mass; a constant sphere shape; the same initial radius and accordingly the same initial said density, upon said release of said sphibule from said source; a center for identifying a position of said sphibule; and a finite lifespan based on a threshold of at least one of:
said radius and hence said density of said sphibule;
said rectangular prismatic boundary of said spatial region of said fluid medium;

upon said release of said sphibules from said source, each said sphibule moves in said fluid medium and, over time, increases in said radius and accordingly decreases in said density;

each said sphibule is independent of every other said sphibule with respect to said movement of the released said sphibule in said fluid medium, and with respect to said increasing radius over time and accordingly said decreasing density over time of the released said sphibule in said fluid medium;

effecting a plurality of timesteps for describing change in said radius and change in said position of each said sphibule over time in said fluid medium, thereby describing a spatially variable concentration of said substance over time in said spatial region of said fluid medium, wherein, during said release of said sphibules from said stationary or moving source in said spatial region of said fluid medium, said spatially variable concentration of said substance is characterized by change over time in number of said sphibules and change over time in positional distribution of said sphibules, wherein said change over time in said number of said sphibules is associated with said rate of release of said sphibules from said stationary or moving source in said fluid medium, said timesteps being effected subsequent to the initial said release of said sphibules from said stationary or moving source;

using at least one physical sensor to take measurements indicative of a said density of a said substance over time in a said fluid medium.

2. The method of claim 1, wherein each said timestep includes performing the following acts with respect to each said sphibule:

calculating said radius of said sphibule, said calculating of said radius being based on the previous said radius of said sphibule, wherein if said timestep is the first said timestep, the previous said radius of said sphibule is said radius of said sphibule upon said release of said sphibule from said stationary or moving source, and wherein if said timestep is at least the second said timestep, the previous said radius of said sphibule is said radius of said sphibule in the previous said timestep;

calculating said position of said sphibule, said calculating of said position being based on the previous said position of said sphibule, wherein said position of said sphibule is equated to said center of said sphibule, wherein if said timestep is the first said timestep, the previous said position of said sphibule is said position of said sphibule upon said release of said sphibule from said stationary or moving source, and wherein if said timestep is at least the second said timestep, the previous said position of said sphibule is said position of said sphibule in the previous said timestep.

3. The method of claim 2, wherein said fluid medium is liquid, and wherein in each said timestep said calculating of said position of each said sphibule includes consideration of the following:
velocity of current of said fluid medium;
gravitational acceleration of said sphibule;
buoyant acceleration of said sphibule.

4. The method of claim 2, wherein:
said fluid medium is liquid;
in each said timestep, said calculating of said position of each said sphibule includes consideration of the following relationship:

$$r = r_0 + v_{current} t + \frac{1}{2}(g-b)t^2;$$

$r_0$ is the previous said position of said sphibule;
r is the present said position of said sphibule;
$v_{current}$ is the velocity of the current of the liquid said fluid medium;
t is the time elapsed since the previous said position of said sphibule;
g is the acceleration of said sphibule due to gravity;
b is the acceleration of said sphibule due to buoyancy.

5. The method of claim 2, wherein:
the method further comprises delimiting said spatial region for said fluid medium;
in each said timestep, every said sphibule whose position exceeds said spatial region is eliminated, the eliminated said sphibule not proceeding to the next said timestep.

6. The method of claim 5, wherein:
the method further comprises establishing said radius threshold for every said sphibule;
in each said timestep, every said sphibule whose radius exceeds said radius threshold is eliminated, the eliminated said sphibule not proceeding to the next said timestep.

7. The method of claim 2, wherein:
the method further comprises delimiting said spatial region for said fluid medium, and establishing said radius threshold for every said sphibule;
in each said timestep, every said sphibule with respect to which at least one of the following occurs is eliminated, the eliminated said sphibule not proceeding to the next said timestep: the position of said sphibule exceeds said spatial region; the radius of said sphibule exceeds said radius threshold.

8. The method of claim 2, wherein:
the time elapsed since the previous said position of said sphibule is taken into consideration in said calculating of said radius of said sphibule and in said calculating of said position of said sphibule;
in each said timestep, said calculating of said radius of each said sphibule includes consideration of the following relationship:

$$R = R_0 + c_0 t^n;$$

$R_0$ is a radial length of said sphibule when said sphibule is in its previous said position;
R is said radial length of said sphibule when said sphibule is in its present said position;
t is the time elapsed since the previous said position of said sphibule;

$c_0$ is a scalar coefficient;

n is a scalar exponent;

in each said timestep, said scalar coefficient $c_0$ and said scalar exponent n are determined based on measurement data from said at least one physical sensor.

9. An apparatus comprising a computer and at least one physical sensor, said computer having computer code characterized by computer program logic for enabling said computer to model the spread of a substance over time in a fluid medium, said at least one physical sensor being capable of taking measurements indicative of a said density of a said substance over time in a said fluid medium, said computer code being executable by said computer so that, in accordance with said computer program logic, said computer performs acts including:

defining a multiplicity of sphibules in a spatial region of a fluid medium characterized by a rectangular prismatic boundary and three dimensions, wherein:

said sphibules are continuously being released from a stationary or moving source in said fluid medium;

said sphibules are characterized by a rate of said release from said stationary or moving source in said fluid medium;

said sphibules collectively represent a substance that is propagative in said fluid medium, said substance consisting of said sphibules;

each said sphibule is a separate and discrete sphere individually representing a separate and discrete quantity of said substance;

each said sphibule is characterized by: a uniform density; the same constant mass; a constant sphere shape; the same initial radius and accordingly the same initial said density, upon said release of said sphibules from said source; a center for identifying a position of said sphibule; and a finite lifespan based on a threshold of at least one of:

said radius and hence said density of said sphibule;

said rectangular prismatic boundary of said spatial region of said fluid medium;

upon said release of said sphibules from said source, each said sphibule moves in said fluid medium and, over time, increases in said radius and accordingly decreases in said density;

each said sphibule is independent of every other said sphibule with respect to said movement of the released said sphibule in said fluid medium, and with respect to said increasing radius over time and accordingly said decreasing density over time of the released said sphibule in said fluid medium:

effecting a plurality of timesteps for describing change in said radius and change in said position of each said sphibule over time in said spatial region of said fluid medium, thereby describing a spatially variable concentration of said substance over time in said fluid medium, wherein, during said release of said sphibules from said stationary or moving source in said spatial region of said fluid medium, said spatially variable concentration of said substance is characterized by change over time in number of said sphibules and change over time in positional distribution of said sphibules, wherein said change over time in said number of said sphibules is associated with said rate of release of said sphibules from said stationary or moving source in said fluid medium, said timesteps being effected subsequent to the initial said release of said sphibules from said source.

10. The apparatus of claim 9, wherein in accordance with said computer program logic, in each said timestep with respect to each said sphibule said computer performs acts including:

calculating said radius of said sphibule, said calculating of said radius being based on the previous said radius of said sphibule, wherein if said timestep is the first said timestep, the previous said radius of said sphibule is said radius of said sphibule upon said release of said sphibule from said source, and wherein if said timestep is at least the second said timestep, the previous said radius of said sphibule is said radius of said sphibule in the previous said timestep;

calculating said position of said sphibule, said calculating of said position being based on the previous said position of said sphibule, wherein said position of said sphibule is equated to said center of said sphibule, wherein if said timestep is the first said timestep, the previous said position of said sphibule is said position of said sphibule upon said release of said sphibule from said source, and wherein if said timestep is at least the second said timestep, the previous said position of said sphibule is said position of said sphibule in the previous said timestep.

11. The apparatus of claim 10, wherein in accordance with said computer program logic:

said fluid medium is liquid;

in each said timestep, said calculating of said position of each said sphibule includes consideration of the following position relationship:

$$r = r_0 + v_{current} t + \frac{1}{2}(g-b)t^2;$$

in said position relationship, $r_0$ is the previous said position of said sphibule, r is the present said position of said sphibule, $v_{current}$ is the velocity of the current of the liquid said fluid medium, t is the time elapsed since the previous said position of said sphibule, g is the acceleration of said sphibule due to gravity, and b is the acceleration of said sphibule due to buoyancy.

12. The apparatus of claim 10, wherein in accordance with said computer program logic:

said computer performs acts including delimiting said spatial region for said fluid medium, and establishing said radius threshold for every said sphibule;

in each said timestep, said computer performs acts including eliminating every said sphibule with respect to which at least one of the following occurs, the eliminated said sphibule not proceeding to the next said timestep: the position of said sphibule exceeds said spatial region; the radius of said sphibule exceeds said radius threshold.

13. The apparatus of claim 10, wherein in accordance with said computer program logic:

the time elapsed since the previous said position of said sphibule is taken into consideration in said calculating of said radius of said sphibule and in said calculating of said position of said sphibule;

in each said timestep, said calculating of said radius of each said sphibule includes consideration of the following radius relationship:

$$R = R_0 + c_0 t^n;$$

in said radius relationship, $R_0$ is a radial length of said sphibule when said sphibule is in its previous said position, R is said radial length of said sphibule when said sphibule is in its present said position, t is the time elapsed since the previous said position of said sphibule, $c_0$ is a scalar coefficient, and n is a scalar exponent;

in each said timestep, said scalar coefficient $c_0$ and said scalar exponent n are determined based on said measurements taken by said at least one physical sensor.

14. A computer program product for modeling the spread of a substance over time in a fluid medium, the computer program product comprising a non-transitory computer-readable storage medium having computer-readable program code portions stored therein for execution by a computer, the computer-readable program code portions including:

a first executable program code portion, for defining a multiplicity of sphibules in a spatial region of a fluid medium characterized by a rectangular prismatic boundary and three dimensions, wherein:

said sphibules are continuously being released from a stationary or moving source in said fluid medium;

said sphibules are characterized by a rate of said release from said stationary or moving source in said fluid medium;

said sphibules collectively represent a substance that is propagative in said fluid medium, said substance consisting of said sphibules;

each said sphibule is a separate and discrete sphere individually representing a separate and discrete quantity of said substance;

each said sphibule is characterized by: a uniform density; the same constant mass; a constant sphere shape; the same initial radius and accordingly the same initial said density, upon said release of said sphibule from said source; a center for identifying a position of said sphibule; and a finite lifespan based on a threshold of at least one of:

said radius and hence said density of said sphibule;
said rectangular prismatic boundary of said spatial region of said fluid medium;

upon said release of said sphibules from said source, each said sphibule moves in said fluid medium and, over time, increases in said radius and accordingly decreases in said density;

each said sphibule is independent of every other said sphibule with respect to said movement of the released said sphibule in said fluid medium, and with respect to said increasing radius over time and accordingly said decreasing density over time of the released said sphibule in said fluid medium;

a second executable program code portion, for effecting a plurality of timesteps for describing change in said radius and change in said position of each said sphibule over time in said fluid medium, thereby describing a spatially variable concentration of said substance over time in said spatial region of said fluid medium, wherein, during said release of said sphibules from said stationary or moving source in said spatial region of said fluid medium, said spatially variable concentration of said substance is characterized by change over time in number of said sphibules and change over time in positional distribution of said sphibules, wherein said change over time in said number of said sphibules is associated with said rate of release of said sphibules from said stationary or moving source in said fluid medium, said timesteps being effected subsequent to the initial said release of said sphibules from said source;

a third executable program code portion, for processing measurements taken by at least one physical sensor, said measurements indicative of a said density of a said substance over time in a said fluid medium.

15. The computer program product of claim 14, wherein in each said timestep with respect to each said sphibule said computer performs acts including:

calculating said radius of said sphibule, said calculating of said radius being based on the previous said radius of said sphibule, wherein if said timestep is the first said timestep, the previous said radius of said sphibule is said radius of said sphibule upon said release of said sphibule from said source, and wherein if said timestep is at least the second said timestep, the previous said radius of said sphibule is said radius of said sphibule in the previous said timestep;

calculating said position of said sphibule, said calculating of said position being based on the previous said position of said sphibule, wherein said position of said sphibule is equated to said center of said sphibule, wherein if said timestep is the first said timestep, the previous said position of said sphibule is said position of said sphibule upon said release of said sphibule from said source, and wherein if said timestep is at least the second said timestep, the previous said position of said sphibule is said position of said sphibule in the previous said timestep.

16. The computer program product of claim 15, wherein in each said timestep, said calculating of said position of each said sphibule includes relating the present said position of said sphibule to the previous said position of said sphibule in a liquid said fluid medium in accordance with the equation $$r = r_0 + v_{current}t + \frac{1}{2}(g - b)t^2,$$

wherein $r_0$ is the previous said position of said sphibule, r is the present said position of said sphibule, $v_{current}$ is the velocity of the current of the liquid said fluid medium, t is the time elapsed since the previous said position of said sphibule, g is the acceleration of said sphibule due to gravity, and b is the acceleration of said sphibule due to buoyancy.

17. The computer program product of claim 15, wherein:

said computer performs acts including delimiting said spatial region for said fluid medium, and establishing said radius threshold for every said sphibule;

in each said timestep, said computer performs acts including eliminating every said sphibule with respect to which at least one of the following occurs, the eliminated said sphibule not proceeding to the next said timestep: the position of said sphibule exceeds said spatial region; the radius of said sphibule exceeds said radius threshold.

18. The computer program product of claim 15, wherein:

the time elapsed since the previous said position of said sphibule is taken into consideration in said calculating of said radius of said sphibule and in said calculating of said position of said sphibule;

in each said timestep, said calculating of said radius of each said sphibule includes attributing a sphere shape to said sphibule, and relating the present said radius of said sphibule to the previous said radius of said sphibule in accordance with the equation:

$$R=R_0+c_0t^n;$$

$R_0$ is a radial length of said sphibule when said sphibule is in its previous said position, R is said radial length of said sphibule when said sphibule is in its present said position, t is the time elapsed since the previous said position of said sphibule, $c_0$ is a scalar coefficient, and n is a scalar exponent;

in each said timestep said scalar coefficient $c_c$, and said scalar exponent n are determined based on said measurements received from said at least one physical sensor.

19. The computer program product of claim 18, wherein:

in each said timestep, said calculating of said position of each said sphibule includes relating the present said position of said sphibule to the previous said position of said sphibule in a liquid said fluid medium in accordance with the equation $$r = r_0 + v_{current}t + \frac{1}{2}(g-b)t^2,$$

wherein $r_0$ is the previous said position of said sphibule, r is the present said position of said sphibule, $v_{current}$ is the velocity of the current of the liquid said fluid medium, t is the time elapsed since the previous said position of said sphibule, g is the acceleration of said sphibule due to gravity, and b is the acceleration of said sphibule due to buoyancy;

said computer performs acts including delimiting said spatial region for said fluid medium, and establishing said radius threshold for every said sphibule;

in each said timestep, said computer performs acts including eliminating every said sphibule with respect to which at least one of the following occurs, the eliminated said sphibule not proceeding to the next said timestep: the position of said sphibule exceeds said spatial region; the radius of said sphibule exceeds said radius threshold.

20. A computer-implemented method for modeling the spread of a substance over time in a fluid medium, the method comprising:

defining a multiplicity of sphibules in a spatial region of a fluid medium, said spatial region characterized by a spatial boundary and three dimensions, wherein:

said sphibules are continuously being released from a stationary or moving source in said fluid medium;

said sphibules are characterized by a rate of said release from said stationary or moving source in said fluid medium;

said sphibules collectively represent a substance that is propagative in said fluid medium, said substance consisting of said sphibules;

each said sphibule is a separate and discrete entity individually representing a separate and discrete quantity of said substance;

each said sphibule is characterized by a three-dimensional geometric shape selected from the group consisting of sphere, non-spherical ellipsoid, cuboid, non-cuboidal prism, cylinder, cone, pyramid, and torus;

each said sphibule is characterized by: a uniform density; the same constant mass; a constant said three-dimensional geometric shape; the same initial volume and accordingly the same initial uniform density, upon said release of said sphibule from said source; a center for identifying a position of said sphibule; and a finite lifespan based on a threshold of at least one of:

said volume and hence said density of said sphibule;

said spatial boundary of said spatial region of said fluid medium;

upon said release of said sphibules from said source, each said sphibule moves in said fluid medium and, over time, increases in said volume and accordingly decreases in said density;

each said sphibule is independent of every other said sphibule with respect to said movement of the released said sphibule in said fluid medium, and with respect to said increasing volume over time and accordingly said decreasing density over time of the released said sphibule in said fluid medium;

effecting a plurality of timesteps for describing change in said volume and change in said position of each said sphibule over time in said fluid medium, thereby describing a spatially variable concentration of said substance over time in said spatial region of said fluid medium, wherein, during said release of said sphibules from said stationary or moving source in said spatial region of said fluid medium, said spatially variable concentration of said substance is characterized by change over time in number of said sphibules and change over time in positional distribution of said sphibules, wherein said change over time in said number of said sphibules is associated with said rate of release of said sphibules from said stationary or moving source in said fluid medium, said timesteps being effected subsequent to the initial said release of said sphibules from said stationary or moving source, wherein each said timestep includes performing the following acts with respect to each said sphibule:

calculating said volume of said sphibule, said calculating of said volume being based on the previous said volume of said sphibule, wherein if said timestep is the first said timestep, the previous said volume of said sphibule is said volume of said sphibule upon said release of said sphibule from said stationary or moving source, and wherein if said timestep is at least the second said timestep, the previous said volume of said sphibule is said volume of said sphibule in the previous said timestep;

calculating said position of said sphibule, said calculating of said position being based on the previous said position of said sphibule, wherein said position of said sphibule is equated to said center of said sphibule, wherein if said timestep is the first said timestep, the previous said position of said sphibule is said position of said sphibule upon said release of said sphibule from said stationary or moving source, and wherein if said timestep is at least the second said timestep, the previous said position of said sphibule is said position of said sphibule in the previous said timestep;

using at least one physical sensor to take measurements indicative of a said density of a said substance over time in a said fluid medium;

wherein the time elapsed since the previous said position of said sphibule is taken into consideration in said calculating of said volume of said sphibule and in said calculating of said position of said sphibule.

* * * * *